United States Patent
Valisko

[19]
[11] Patent Number: 6,119,454
[45] Date of Patent: Sep. 19, 2000

[54] EXHAUST MANIFOLD DEVICE

[75] Inventor: Steven Valisko, Lantau Island, The Hong Kong Special Administrative Region of the People's Republic of China

[73] Assignee: Gentech Design Limited, Queensway, The Hong Kong Special Administrative Region of the People's Republic of China

[21] Appl. No.: 09/101,513

[22] PCT Filed: Jan. 10, 1997

[86] PCT No.: PCT/GB97/00081

§ 371 Date: Jul. 10, 1998

§ 102(e) Date: Jul. 10, 1998

[87] PCT Pub. No.: WO97/25526

PCT Pub. Date: Jul. 17, 1997

[30] Foreign Application Priority Data

Jan. 12, 1996 [GB] United Kingdom .................... 9600642

[51] Int. Cl.[7] ........................................................ F01N 3/00
[52] U.S. Cl. .................. 60/293; 60/292; 60/324; 60/307; 60/319; 137/512; 137/513.7; 137/550
[58] Field of Search .............................. 60/290, 292, 305, 60/307, 308, 317, 316, 319, 280, 324, 293; 137/512, 513.7, 550

[56] References Cited

U.S. PATENT DOCUMENTS

| | | |
|---|---|---|
| 3,287,899 | 11/1966 | Bintz . |
| 3,455,106 | 7/1969 | Flint . |
| 3,871,175 | 3/1975 | Yamamoto . |
| 3,975,905 | 8/1976 | Shimo et al. .............................. 60/290 |
| 4,162,613 | 7/1979 | Tamura et al. ............................ 60/278 |
| 4,257,227 | 3/1981 | Sato et al. ................................ 60/290 |
| 4,534,173 | 8/1985 | Tsukamoto ............................... 60/606 |
| 5,177,958 | 1/1993 | Clemens et al. .......................... 60/293 |
| 5,421,366 | 6/1995 | Naffziger et al. ..................... 137/614.2 |
| 5,499,502 | 3/1996 | Haniu et al. .............................. 60/290 |
| 5,699,664 | 12/1997 | LaFleur .................................... 60/307 |

FOREIGN PATENT DOCUMENTS 0 041 831  12/1981  European Pat. Off. .

OTHER PUBLICATIONS

Copy Not Presently Available Patent Abstracts of Japan, vol. 095, No. 010, Nov. 30, 1995.

Copy Not Presently Available Patent Abstracts of Japan, vol. 012, No. 182, May, 27, 1988.

*Primary Examiner*—Thomas Denion
*Assistant Examiner*—Binh Tran
*Attorney, Agent, or Firm*—Jacobson, Price, Holman & Stern PLLC

[57] ABSTRACT

An exhaust manifold device is provided to allow air to enter an exhaust manifold during normal operation of an engine to prevent exhaust gases being sucked into the cylinders via exhaust valves. Air can be supplied via valves (18 and 21) to the exhaust manifold as required and is supplied to the valve (21) at pressures, above atmospheric pressure, that increase with engine speed.

8 Claims, 2 Drawing Sheets

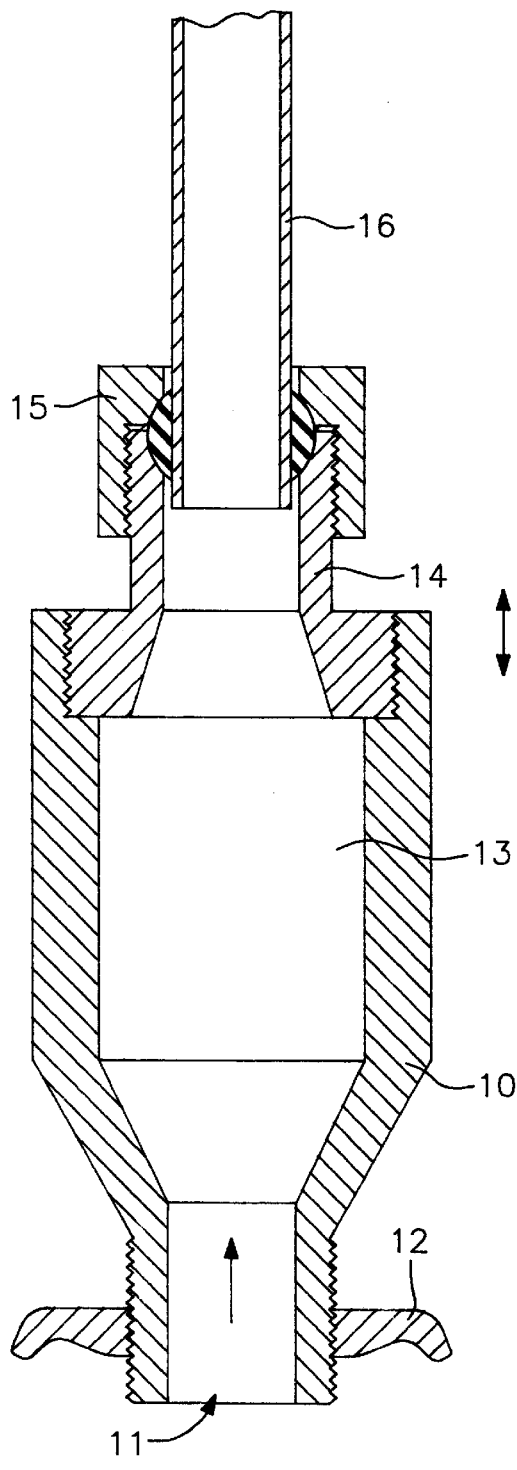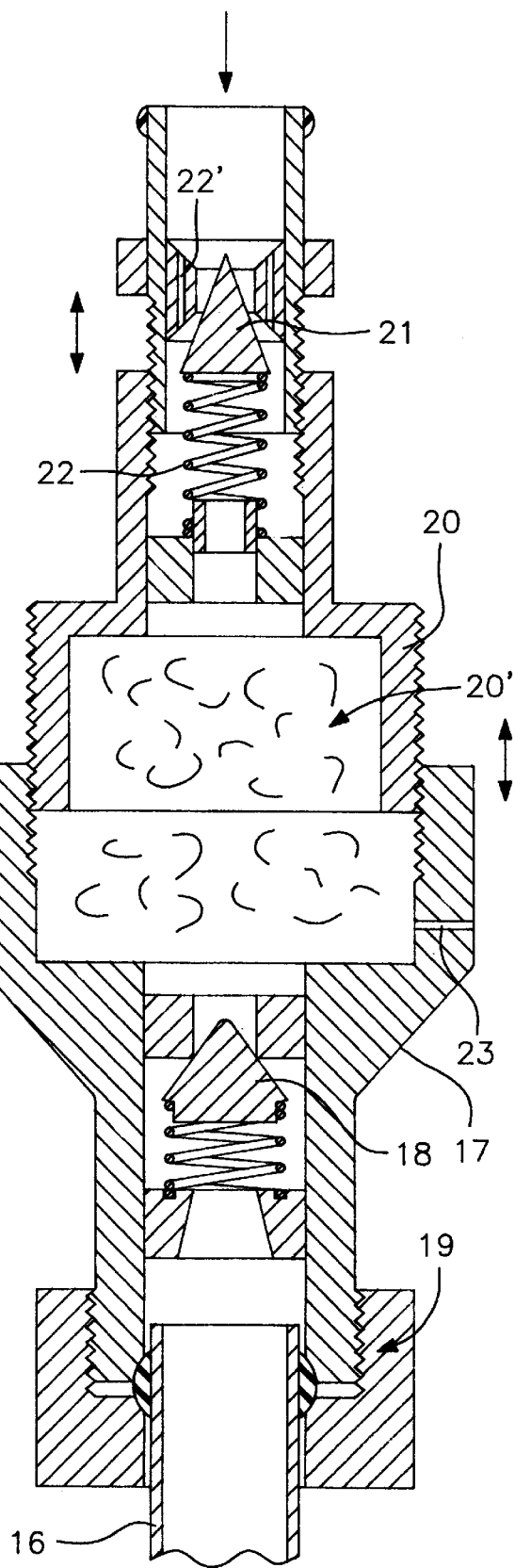

EXHAUST MANIFOLD DEVICE

BACKGROUND OF THE INVENTION

1. Field of the Invention

The invention relates to exhaust manifold devices.

2. Description of the Related Art

The invention relates more particular to devices that are arranged to automatically allow air to enter the exhaust manifold to prevent inter alia exhaust gases being sucked into engine cylinders during the normal operation of the engine. Such devices or aspirators have been disclosed already in, for example, U.S. Pat. No. 3,455,106 and European Patent 0041831. Devices so far proposed comprise relatively complicated mechanical arrangements and do not operate efficiency at higher engine speeds or at a variety of engine speeds.

It is an object of the invention to overcome or at least reduce these problems,

According to the invention there is provided an aspirator for allowing air automatically to selectively enter an engine exhaust manifold during operation of an internal combustion engine to inhibit exhaust gases being drawn back into the cylinders via exhaust valves, the aspirator comprising an adapter that fits to the manifold having a port in communication with the manifold, a first one way valve fitted to the adapter that prevents gases leaving the manifold through the port when the pressure inside the manifold is greater than the pressure at the first valve, and a second one way valve connected by a passageway to the first valve, the second one way valve being arranged to allow air to enter the passageway whenever the pressure inside the passageway is less than the pressure at the second valve; and means for supplying air to the second valve at different pressures, above atmospheric pressure, that increase with increases of speed of the engine.

The aspirator may comprise a hollow body that extends to the port fitted to the manifold and the port be formed in a tube that extends somewhat in to the manifold beyond its inner surface.

The hollow body may be formed with an intermediate expansion chamber.

The one way valves may each comprise a needle valve.

The passageway is preferably formed with an intermediate expansion chamber.

The position of the second one way valve may be manually adjustable to vary the differential pressure at which the second valve opens and closes.

The air may be supplied to the second one way valve by an air ram having an inlet exposed forwardly in a vehicle in which the engine is mounted so as to provide air at a pressure corresponding to the forward speed of the vehicle.

The air may also or alternatively be supplied by an air pump, and the air pump may form part of a turbo charger for the engine.

An exhaust manifold device or aspirator according to the invention will now be described by way of example with reference to the accompanying schematic drawings in which:

BRIEF DESCRIPTION OF THE DRAWINGS

FIG. 1 is a sectional side view of an adapter of the device;

FIG. 2 in a sectional side view of the device which fits above the adapter in use;

DETAILED DESCRIPTION OF THE DRAWINGS

Figure 3:
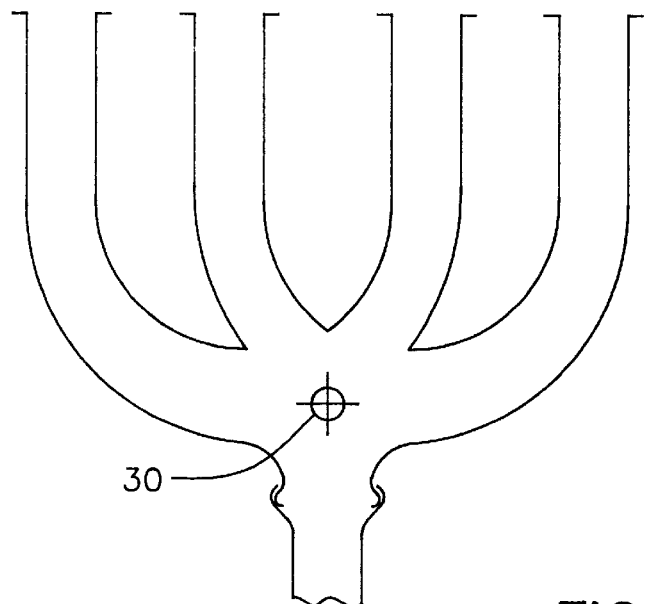
FIG. 3 is a top plan view of an exhaust manifold.

Referring to the drawings, in FIG. 1 the adapter comprises a lower part 10 including a port 11 that screw fits to an engine manifold 12. The lower part incorporates an expansion chamber 13 that is closed off by hollow cap 14 extending up to a gland fitting 15 which seals and connects the cap 14 to a cylindrical tube 16.

It will be noted that the bottom edge of the port 11 extends somewhat into the manifold 12 and beyond its inner surface. This makes the port more sensitive to the flow of gases and pressure in the manifold. Also, hot exhaust gases are less inclined to be swept into the port 11 and corrode valve seatings in the device. The provision of the expansion chamber 13 ensures that any flow of air towards the manifold is accelerated and so "rammed" through the port 11, when required, into the manifold.

In FIG. 2, the tube 16 is attached to a lower housing 17 incorporating a first one way needle valve 18 by a gland coupling 19. An upper housing 20 is slidably or otherwise adjustably attached to the lower housing 17 so that the housings together form an expansion chamber 20'. The effective size or capacity of the chamber 20' can be varied as and when required but serves as a pressure damper between the first valve 18 and a second one way needle valve 21. The valve 21 is biassed by a spring 22 and fitted to an upper end of the housing 20 by a screw thread so that manually adjustment can be made to increase or decrease the effective spring bias. This adjustment enables the differential pressure at which the valve 21 opens and closes to be varied. The device includes two high pressure bi-pass and relief ports 22' and 23.

In general, the device is provided to allow air to enter the exhaust manifold from atmosphere via the valves 18 and 21 as and when required, and as already known in principle in the prior art. In devices of the present invention air is supplied to the valve 21 under pressure when the engine speeds up so that a supply of pressurised air is provided through the port 11 to ensure efficient operation at all times. The pressurised air is preferably supplied for the exhaust of a moving vehicle by feeding air from a forward facing inlet. Thus, as vehicle speeds up the pressure of the air supplied to the valve 21 automatically increases to correspond to the engine speed and provide a supply of increased pressurised air to the port 11 as desired. The pressurised air can also be supplied from an electric fan, say, or a turbo charger fan, as shown in FIG. 4.

FIG. 3 shows at 30, a central preferable location for fitting the device to a manifold of a four cylinder engine. The location is chosen to coincide with a region where the flow of exhaust gases is mixed generally evenly from all four cylinders. It is of course possible to use other locations or provide more than one device in which case the choice of location will depend on which and an how many cylinders are served by each device.

Figure 4:
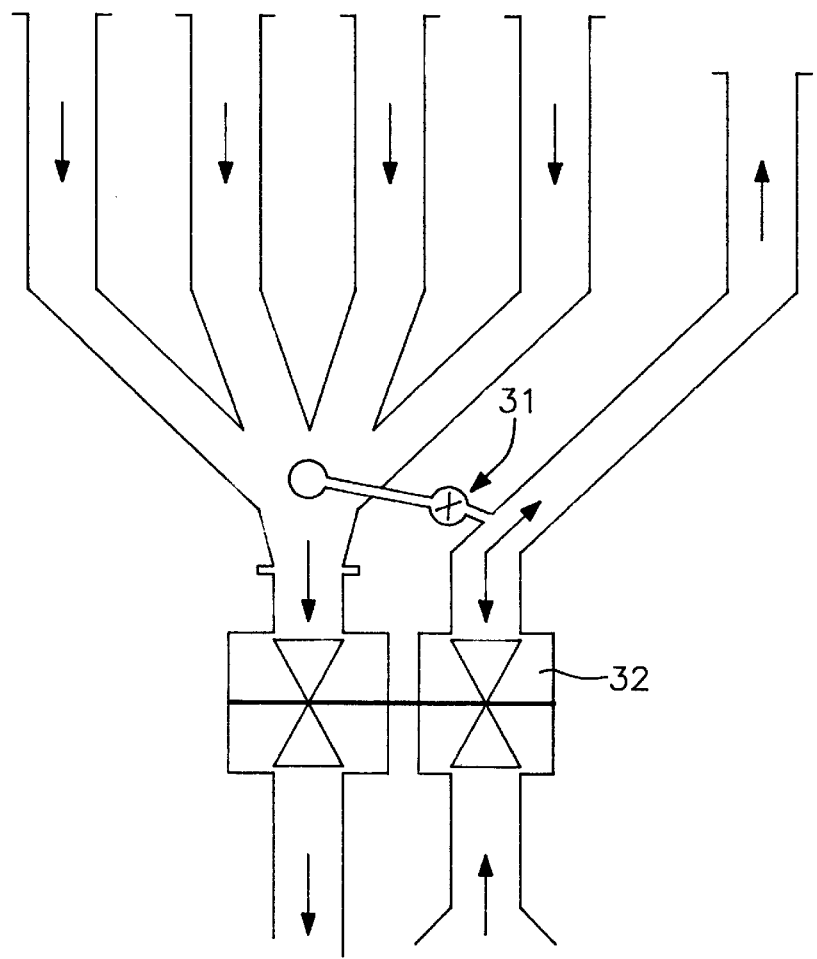
FIG. 4 is a top plan view of the device in a turbo charger application of the device.

In FIG. 4, the device of the invention is provided with air at elevated pressure as required from a bleed-valve 31 connected to an outlet of a turbo charger fan 32. The outlet air is normally fed to force fuel-air mixture into the engine cylinders but a sufficient amount is used, that is diverted or bled, to create a supply and elevated pressure of air at the inlet to the needle valve is of the device.

What is claimed:

1. An aspirator for allowing air automatically to selectively enter an engine exhaust manifold during operation of an internal combustion engine to inhibit exhaust gases being drawn back into the cylinders via exhaust valves, the aspirator comprising an adapter formed by a hollow body that extends to a port fitted in communication with the manifold, a first one way valve fitted to the adapter that prevents gases leaving the manifold through the port when the pressure inside the manifold is greater than the pressure at the first valve, and means for supplying air to a second one way valve at different pressures, above atmospheric pressure, that increase with increases of speed of the engine, in which the second one way valve is connected by a passageway to the first valve forming an intermediate expansion chamber having a relief port to atmosphere, the second one way valve being arranged to allow air to enter the passageway whenever the pressure inside the passageway is less than the pressure at the second valve.

2. The aspirator of claim 1, wherein the port is formed in a tube that extends into the manifold beyond its inner surface.

3. The aspirator of claim 1, wherein the one way valves each comprises a needle valve.

4. The aspirator of claim 1, wherein the position of the second one way valve is manually adjustable to vary the differential pressure at which the second valve opens and closes.

5. The aspirator of claim 1, wherein the air is supplied to the second one way valve by an air ram having an inlet exposed forwardly in a vehicle in which the engine is mounted so as to provide air at a pressure corresponding to the forward speed of the vehicle.

6. The aspirator of claim 1, wherein the air is supplied by an air pump.

7. The aspirator of claim 6, wherein the air pump forms part of a turbo charger for the engine.

8. The aspirator of claim 1, in which air is supplied to the second valve corresponding to all speeds of the engine.

* * * * *